(12) United States Patent
Hatrick (10) Patent No.: US 8,256,204 B2
(45) Date of Patent: Sep. 4, 2012

(54) AIRCRAFT ENGINE THRUST REVERSER

(75) Inventor: Michael John Hatrick, Belfast (GB)

(73) Assignee: Short Brothers PLC, Belfast (GB)

( * ) Notice: Subject to any disclaimer, the term of this patent is extended or adjusted under 35 U.S.C. 154(b) by 552 days.

(21) Appl. No.: 12/438,488

(22) PCT Filed: Aug. 21, 2007

(86) PCT No.: PCT/GB2007/003192
§ 371 (c)(1),
(2), (4) Date: Feb. 23, 2009

(87) PCT Pub. No.: WO2008/023168
PCT Pub. Date: Feb. 28, 2008

(65) Prior Publication Data
US 2009/0301056 A1 Dec. 10, 2009

(30) Foreign Application Priority Data

Aug. 24, 2006 (GB) .................................. 0616740.7

(51) Int. Cl.
*F02K 3/02* (2006.01)
*F02K 1/72* (2006.01)
(52) U.S. Cl. ................. 60/226.2; 244/110 B; 239/265.31
(58) Field of Classification Search .................. 60/226.2, 60/230, 232, 771; 244/110 B; 239/265.19, 239/265.29, 265.31
See application file for complete search history.

(56) References Cited

U.S. PATENT DOCUMENTS

| 2,793,494 | A |   | 5/1957  | Kadosch et al. | |
|-----------|---|---|---------|----------------|-|
| 3,519,207 | A | * | 7/1970  | Clough ..................... | 239/265.19 |
| 3,915,415 | A | * | 10/1975 | Pazmany ..................... | 60/226.2 |
| 3,981,450 | A | * | 9/1976  | McCardle et al. ........ | 239/265.31 |
| 4,232,516 | A | * | 11/1980 | Lewis et al. ................... | 60/226.2 |
| 6,311,928 | B1 |  | 11/2001 | Presz, Jr. et al. | |
| 6,438,942 | B2 | * | 8/2002  | Fournier et al. ............. | 60/226.2 |
| 6,968,675 | B2 | * | 11/2005 | Ramlaoui et al. ............ | 60/226.2 |
| 2001/0010148 | A1 |  | 8/2001 | Michel et al. | |

FOREIGN PATENT DOCUMENTS

| EP | 0 852 290 A1 | 7/1998 |
| EP | 1 515 035 A2 | 3/2005 |
| EP | 1 852 595 A2 | 11/2007 |
| GB | 2 156 004 A | 10/1985 |
| GB | 2 212 859 A | 8/1989 |

OTHER PUBLICATIONS

Great Britain Search Report Application No. GB 0616740.7, dated Dec. 13, 2006.

* cited by examiner

*Primary Examiner* — Ted Kim (74) *Attorney, Agent, or Firm* — Thomas & Karceski, PC (57) ABSTRACT

A power unit for providing propulsive thrust includes an efflux duct defining a first fluid flow path along which gaseous fluid travels for discharge from a first fluid exit opening to provide propulsive thrust. The power unit also has a thrust reversing structure which, when in a deployed position, redirects the flow of gaseous fluid along a second fluid flow path to discharge from a second fluid exit opening to provide reverse thrust. The thrust reversing structure includes longitudinally translating cowl portions, which are moveable from a stowed position to the deployed position where the translating cowl portions block a major portion of the first fluid exit opening to cause gaseous fluid to efflux from the second fluid exit opening. The translating cowl portions move in a generally longitudinal direction towards the deployed position along a path which is inclined to the power unit axis.

13 Claims, 8 Drawing Sheets

AIRCRAFT ENGINE THRUST REVERSER

CROSS-REFERENCE TO RELATED APPLICATION(S)

This United States Non-Provisional Patent Application is a National Stage Entry based upon and relying for priority upon PCT Patent Application No. PCT/GB2007/003192, which was filed on Aug. 21, 2007. This patent application also relies for priority on Great Britain patent Application No. 0616740.7, which was filed on Aug. 24, 2006. The contents of both applications are incorporated herein by reference.

FIELD OF THE INVENTION

The present invention relates to a thrust reverser structure for an aircraft engine and to an engine having that thrust reverser structure.

BACKGROUND

Thrust reversers for aircraft engines, particularly gas turbine engines, are well known and take many and varied forms.

One form of thrust reverser structure when used on a gas turbine engine having a by-pass fan and by-pass fan duct utilises so-called blocker doors which are activated by a cowl portion which translates rearwardly in a direction parallel to the engine axis and activates the blocker doors by means of an articulated linkage to substantially block the by-pass duct to propulsive fluid flow and redirect that fluid flow through a second outlet having flow directing cascades to provide reverse thrust to slow an aircraft when landing, for example. Whilst the by-pass fan duct may be contoured to optimise fluid flow therethrough when in normal propulsive mode to provide forward thrust, the blocker doors add weight as do the cascades which has implications for fuel economy. Furthermore, the articulated activating linkage also adds weight, is prone to wear and requires maintenance all of which add cost.

More recently, thrust reversers known as "natural blockage" thrust reversers have been successfully used. Examples of this type of thrust reverser are exemplified in GB-A-2 368 566 and EP-A-1 515 035 both of which are of common ownership herewith. In this type of thrust reverser, a translating cowl moves in a rearwardly direction parallel to the engine axis to open an outlet through which a fluid efflux emanates in a generally forwardly direction to provide reverse thrust. In this thrust reverser structure, the by-pass fan duct has a more exaggerated curved contour in the region of the reverse thrust fluid outlet when viewed in the radial direction so as to enable structure on the translating cowl itself to block fluid flow to the by-pass fan duct propulsive outlet. Thus, the cowl structure itself "naturally blocks" the by-pass fan duct and obviates the need for blocker doors and their associated structure and mechanisms. This results in a thrust reverser which is simpler and more reliable because complexity is removed with a consequent reduction in weight. Furthermore, this type of thrust reversing arrangement more efficiently blocks the by-pass fan duct than do the earlier blocker door arrangements. However, in order to make this type of thrust reverser operate, the by-pass fan duct must have a more pronounced curvature or profile resulting in the surface area of the by-pass fan duct being increased which causes a small weight increase but, more importantly, causes pressure losses in the fan duct that may reduce forward thrust performance and consequently increase fuel burn. These considerations become increasingly important as engine size increases. However, this type of thrust reverser has been successfully used on commercial regional jet aircraft.

BRIEF SUMMARY OF THE DISCLOSURE

According to the present invention, there is provided a power unit for providing propulsive thrust by means of a flow of gaseous fluid, the power unit comprising an efflux duct defining a first fluid flow path along which said gaseous fluid travels for discharge from a first fluid exit opening to provide said propulsive thrust; the power unit having a thrust reversing structure which, when in an operative deployed position, redirects the flow of gaseous fluid along a second fluid flow path to discharge from a second fluid exit opening to provide reverse thrust; the thrust reversing structure comprising longitudinally translating cowl portions which are moveable from a first stowed position to a second deployed position and in which second deployed position an internal form of said cowl portions blocks at least a major proportion of said efflux duct to cause gaseous fluid efflux from said second fluid exit opening, the thrust reversing structure being characterised in that said cowl portions move in a generally longitudinal direction towards the deployed position along a path which is inclined to the power unit axis.

In the present invention the power unit axis is the axis about which the rotating elements of the power unit rotate. An example of a power unit contemplated in the present invention is a gas turbine engine.

In a preferred embodiment of the present invention the power unit may be a gas turbine engine having a by-pass fan and by-pass fan duct. Thus, the efflux duct may be the by-pass fan duct.

In the earlier structures of thrust reverser exemplified in GB-A-2 368 566 and EP-A-1 515 035, the efflux duct in the region of the gas outlet exit for the deployed position of the thrust reverser structure, has a more exaggerated curvature than that of the efflux duct of the power unit of the present invention. This is because in the prior art structures, the translating cowl moves in an axial direction parallel to the engine axis. Thus, it was necessary in the these earlier structures to radially enlarge the efflux duct in the relevant region to permit the internal form of the translating cowl to mate with the cooperating part of the core cowl when moving along a strictly axially directed path. An important advantage of the present invention is that the efflux or by-pass fan duct may now be optimised in respect of largely aerodynamic considerations so that when the engine is in normal propulsive mode, which is for the vast majority of engine operating time, the engine may operate at its aerodynamic optimum consequently optimising fuel economy.

In the present invention because the translating cowl moves along a path which is inclined to the power unit axis, the cowl cannot be in a single piece as it may be in the prior art structures. In the present invention the translating cowl may take the form of two translating cowl portions which may be orientated relative to each other diametrically opposite to one another. Whilst it is stated that there may be two cowl portions, it is feasible for there to be more than two cowl portions, however, it is believed that two cowl portions constitute the most efficient implementation of the present invention in terms of complexity, weight and thrust reversing efficiency.

The power unit may be provided with fixed structure on which the translating cowl portions may be moveably mounted, supported by slider rails. The slider rails may be orientated at an angle to an imaginary plane passing through the power unit axis. The angle at which the translating cowl portions move relative to the power unit axis may depend to a certain extent on the geometry of the engine nacelle itself. However, it is believed that an angle in the range from 5° to 20° may cover most geometries whilst a range of 5° to 12° is more preferred. Clearly, for any one design installation only one unique angle will be employed. The translating cowl portions and fixed structure may be provided with actuators therebetween, for example, to deploy and retract into the stowed position the cowl portions as required.

In a power unit installation where the power unit is mounted on a pylon under the wing, the fixed structure and slider rails mentioned hereinabove may be mounted in the 12 and 6 o'clock positions. Similarly, when the installation is a rear fuselage mounting then the fixed structure and slider rails may be at the 3 and 9 o'clock positions. Thus, the imaginary plane referred to above may be a substantially vertical plane in the former case and a substantially horizontal plane in the latter case.

In one embodiment of the present invention the power unit and thrust reverser structure may employ conventional cascades situated in the second fluid exit opening and exposed to fluid efflux when the translating cowl portions are deployed to their operative positions.

In a further modification of an embodiment employing cascades in the thrust reverser structure, the cascades may be canted or tilted relative to the engine axis giving a slight frusto-conical appearance to the cascades. The leading edge of the cascades (relative to the engine) may have a greater diameter than the trailing edge thereof. The benefit of canted cascades is that the trailing edge is moved further inwardly, away from the trajectory of movement of the translating cowl portions permitting a steeper angle of movement (towards the upper end of the range of 5° to 20° mentioned above) allowing a significantly reduced deployment stroke. The cascades may be canted at an angle of between 0.5° and 10° with a range of 2° to 7° being preferred. The actual angle will depend on the engine configuration in question and will inevitably be a compromise between several variables to provide an optimum overall configuration. A reduced deployment stroke has consequent benefits in weight saving and, where allied to steeper deployment trajectory, the possibility of greater optimisation of the aerodynamics of the by-pass fan duct leading to better fuel burn. This embodiment may be of greatest applicability to larger, more powerful engines where reduction of fuel burn will provide greater overall benefits than maximisation of reverse thrust per se which, in any event, will be entirely adequate.

In another embodiment of the present invention, conventional cascades may be dispensed with and alternative aerodynamic devices such as slots and slats, for example, used to secure the desired reverse thrust from the fluid efflux.

Unlike prior art thrust reverser arrangements where the translatable cowl tends to be a single, generally annularly shaped unit being circumferentially continuous, the thrust reverser cowl portions of the present invention are of necessity constituted by at least two distinct and separate parts since they move relative to each other. The cowl portions of the present invention are arranged, when being deployed, to move along defined paths towards each other away from the stowed position. A consequence of the inner diameters of the translating cowl portions being different to those of the corresponding portions of the core cowl and also being circumferentially non-continuous when in the deployed position is that gaps may exist about the area of separation of the cowl portions between the stationary core cowl and the translating cowl portions at about, for example, the 11 and 1 o'clock and 6 o'clock positions giving leakage of gaseous fluid in these areas and thereby reducing the magnitude of reverse thrust.

However, such gaps may be reduced, minimised or eliminated by tailoring the core cowl shape in these regions to match the deployed translating cowl portion shape at the deployed position. This has the effect of reducing the by-pass fan duct area in these regions when the translating cowl portions are in their stowed position thus reducing the flow area in these regions. This may be compensated for by increasing the area of the by-pass fan duct area in the areas which are completely blocked by the deployed translating cowl portions, for example in the 2 o'clock to 5 o'clock sweep by, for example, reducing the radial extent of the core cowl. Clearly, the shape of the translating cowl inner surface may be adapted to cooperate with the revised shape of the core cowl when in the deployed position.

Whilst the above paragraph discusses the steps which may be taken to reduce or minimise "leakage" of gaseous fluid at the junctions of the inner core cowl and the deployed translating cowl portions by adapting the shape of the core cowl to that of the translating cowl in these regions, it will be apparent to the skilled person that the reverse approach may be employed, that is adapting the shape of the translating cowl to match that of the core cowl. In reality, of course, a compromise between these two extremes is likely to be employed with both the shapes of the core cowl and the corresponding portions of the translating cowl being changed or adapted to match one another as closely as possible whilst seeking an optimum overall benefit in terms of fuel burn and reverse thrust efficiency, one parameter being traded off against the other to achieve a best compromise.

Although a significant advantage of the present invention is that substantially no change is required to the by-pass fan duct shape in order to achieve reverse thrust performance comparable to prior art arrangements whilst recouping the fuel economy losses caused by the prior art arrangements, it is a fact that by utilising the principle of the present invention, for a relatively small change to fan duct shape then even greater weight savings, through shorter deployment stroke (and its consequent effect on actuator length and weight) and a reduction in the angle of the slider rails, may be achieved. Such a small change to fan duct shape may be considered a "best compromise" whereby the small changes have a minimal or insignificant effect on forward thrust performance or fuel burn but nevertheless permit increased weight savings.

The present invention exhibits all of the benefits of prior art so-called natural blockage thrust reversers in that it does not require blocker doors or associated operating mechanisms but, also does not require major changes to the by-pass fan duct geometry thus, saving weight and improving reliability whilst suffering no forward thrust or fuel economy penalties.

BRIEF DESCRIPTION OF THE DRAWINGS

In order that the present invention may be more fully understood, examples will now be described by way of illustration only with reference to the accompanying drawings, of which.

DETAILED DESCRIPTION

Referring now to the drawings and where the same or similar features are denoted by common reference numerals.

Figure 1:
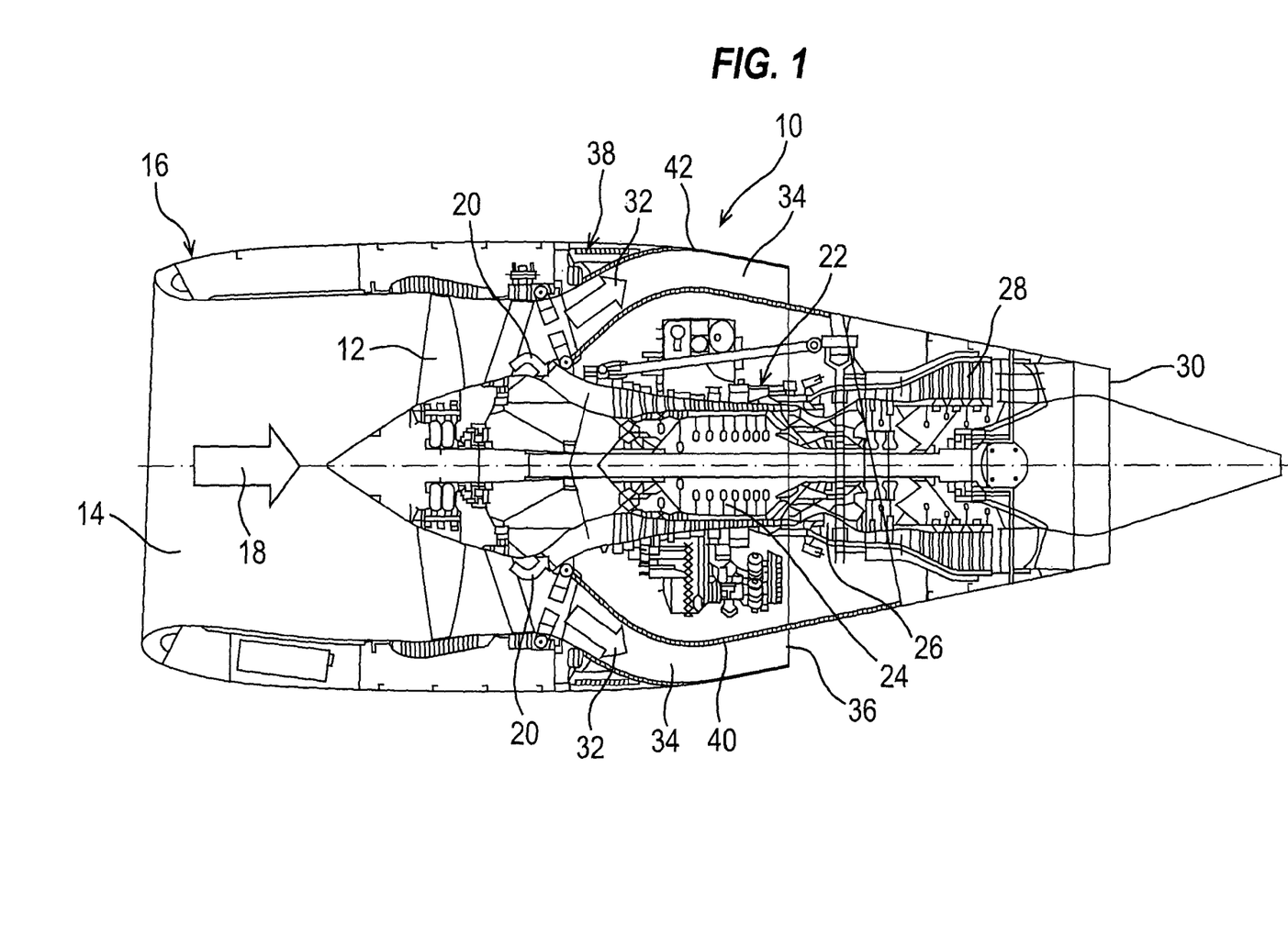
FIG. 1 shows a cross section of a typical prior art by-pass fan equipped gas turbine engine in which the present invention may be utilised.

FIG. 1 shows a cross section through a typical conventional aviation gas turbine engine 10 equipped with a fan 12. The engine has an air inlet 14 surrounded by a by-pass fan cowl 16, the mass of air 18 being initially compressed by the fan 12 before being split into two major portions; the first portion 20 being drawn into the engine core 22 to be further compressed by the compressor section 24 before being mixed with fuel for combustion in the combustor section 26 and expanding through a turbine section 28 before being exhausted through a core exhaust duct nozzle 30; and, the second major portion 32 being diverted through a by-pass fan duct 34 and exhausted through a by-pass fan duct exhaust nozzle 36. The thrust reverser arrangement 38 with which the present invention is concerned is generally located around the middle of the by-pass fan duct 34. The by-pass fan duct 34 comprises an inner cowl member 40 which surrounds and covers the engine core 22 and an outer by-pass fan duct cowl member 42; the inner 40 and outer 42 cowl members defining the internal shape of the by-pass fan duct 34 per se.

Figure 2A:
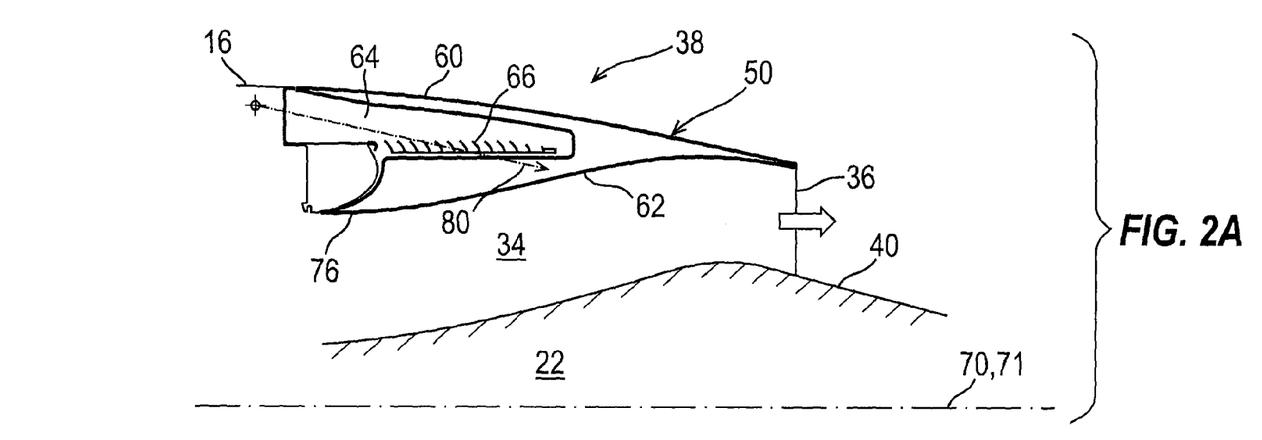
FIGS. 2A and 2B show a cross section of a segment of a by-pass fan duct of an engine similar to that of FIG. 1 having a first embodiment of a thrust reverser arrangement according to the present invention in the stowed and deployed positions, respectively.
Figure 2B:
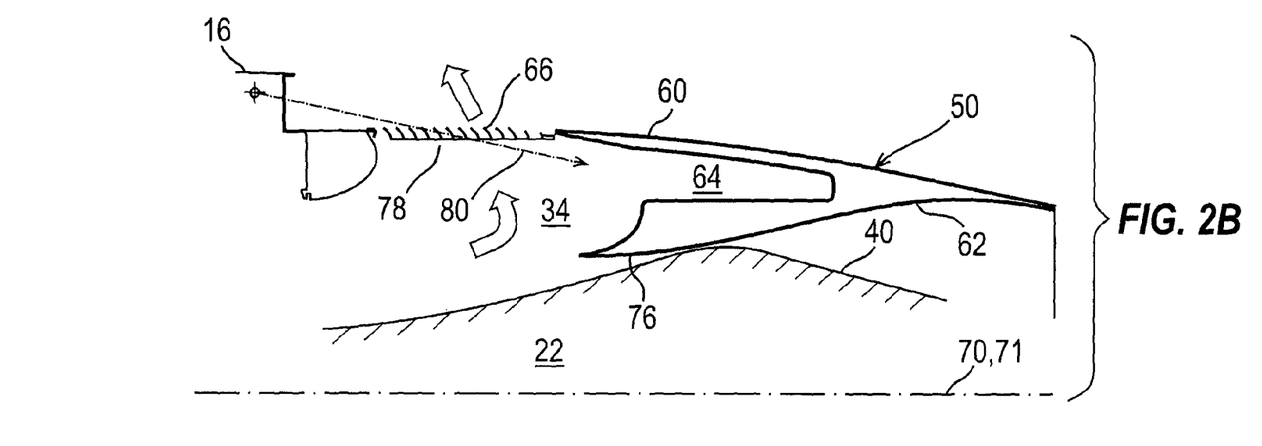
Figure 3A:
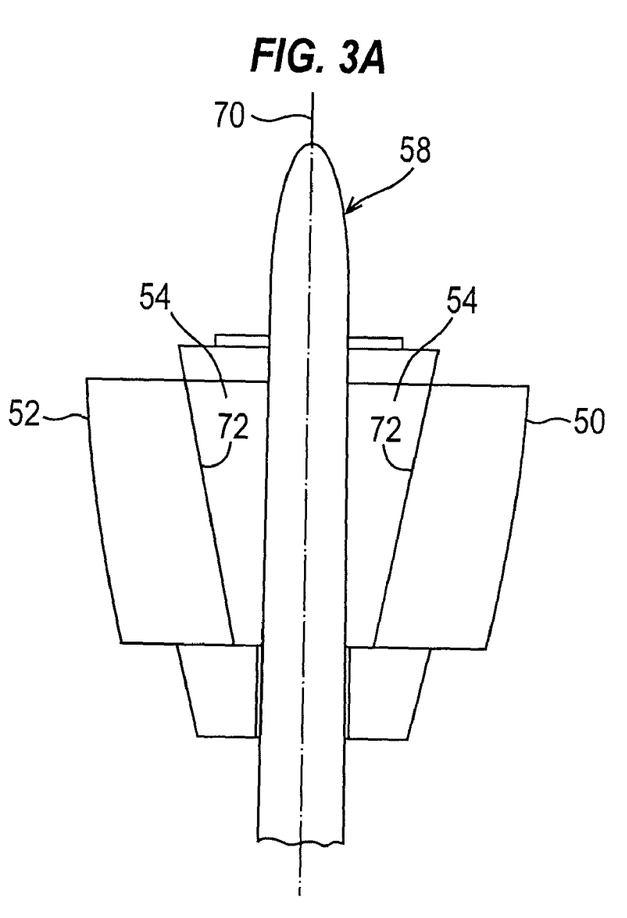
FIGS. 3A and 3B show a schematic plan view of a gas turbine engine having the first embodiment of the present invention shown in FIG. 2.
Figure 3B:
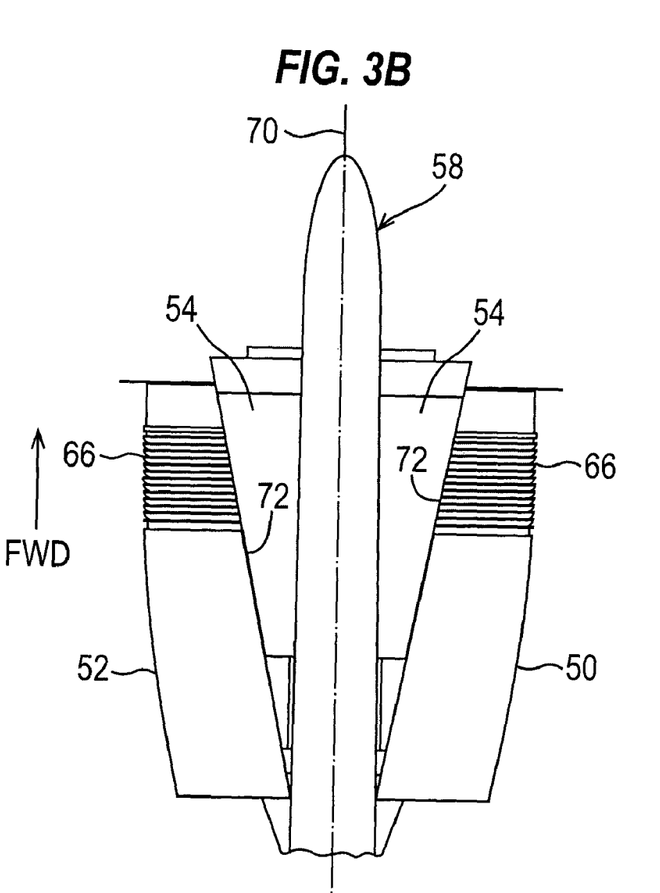

FIGS. 2A and 2B show a schematic cross section through a first embodiment of a thrust reverser arrangement 38 according to the present invention; FIG. 2A being in the stowed (i.e. inoperative position) and 2B being in the deployed (i.e. operative position). Only the essential features of the invention are shown for the sake of clarity, and furthermore, only one side of the engine at a position circumferentially intermediate the location of slider rails on which the translating cowl portions (both of which to be described below) are mounted. FIGS. 2A and 2B are perhaps best viewed together with FIGS. 3A, 3B and FIG. 4 which show the thrust reverser arrangement of the present invention in the context of a whole engine 10 and a mounting pylon therefor.

The thrust reverser arrangement of the present invention comprises an inner by-pass fan duct cowling 40 surrounding the engine core 22 and an outer, translatable by-pass fan duct cowling portion 50. There is a matching by-pass fan duct cowling portion 52 on the opposite side of the engine (see FIGS. 3 and 4). Both cowling portions 50, 52 are mounted on fixed structure 54, 56 at the 12 o'clock and 6 o'clock positions (best seen in FIGS. 3 and 4, respectively) at their circumferential extents, the engine 10 being mounted on a pylon 58 under an aeroplane wing (not shown). The translatable cowl portions 50, 52 comprise an outer surface 60 which, when in the stowed position (FIG. 2A), provides a fairing continuing the aerodynamic contour of the by-pass fan engine cowl 16; and an inner surface portion 62 which provides aerodynamic continuity for the radially outer surface of the by-pass fan duct 34 when in the stowed position. The cowl portions 50, 52 possess a semi-annular inner cavity 64 which in the stowed position covers (in this embodiment) cascade devices 66 which assist in diverting airflow into the reverse direction when the translating cowl portions 50, 52 are deployed into their operative positions.

The fixed structures 54, 56 include angled slider rails (not shown) which are set at a predetermined angle to an imaginary vertical plane 70 (vertical because the engine of this embodiment is mounted on a pylon) passing through the engine axis 71, the cowl portions having cooperating cleats (not shown) which slidably engage the slider rails, the cleats being positioned at the cowl portion edges, 72, 74. The angle of the slider rails is indicated by the arrow 80 in FIG. 2. The slider rails at each cowl portion edge 70, 72 are parallel to each other to permit the essentially rigid cowl portions 50, 52 to slide therealong. Suitable hydraulic actuators (not shown), for example, are located in the cowl portion cavities 64 to move the cowl portions between the stowed and deployed positions. As the cowl portions move rearwardly into their deployed positions an inner leading edge portion 76 of the inner surface 62 is brought into proximity with the inner core cowl surface 40 to block a major proportion of the by-pass fan duct 34 area and cause the air flow to be diverted out of a second gaseous fluid exit opening 78 through the cascade devices 66. The by-pass fan duct nozzle 36 is the first fluid exit opening and through which air exhausts for the vast majority of the engine 10 running time.

In the first embodiment the angle which the slider rails make to the vertical plane 70 is 12°. In this embodiment the 3-dimensional shape of the by-pass fan duct 34 is optimised so as to give the best forward thrust performance and fuel burn characteristics.

Figure 4:
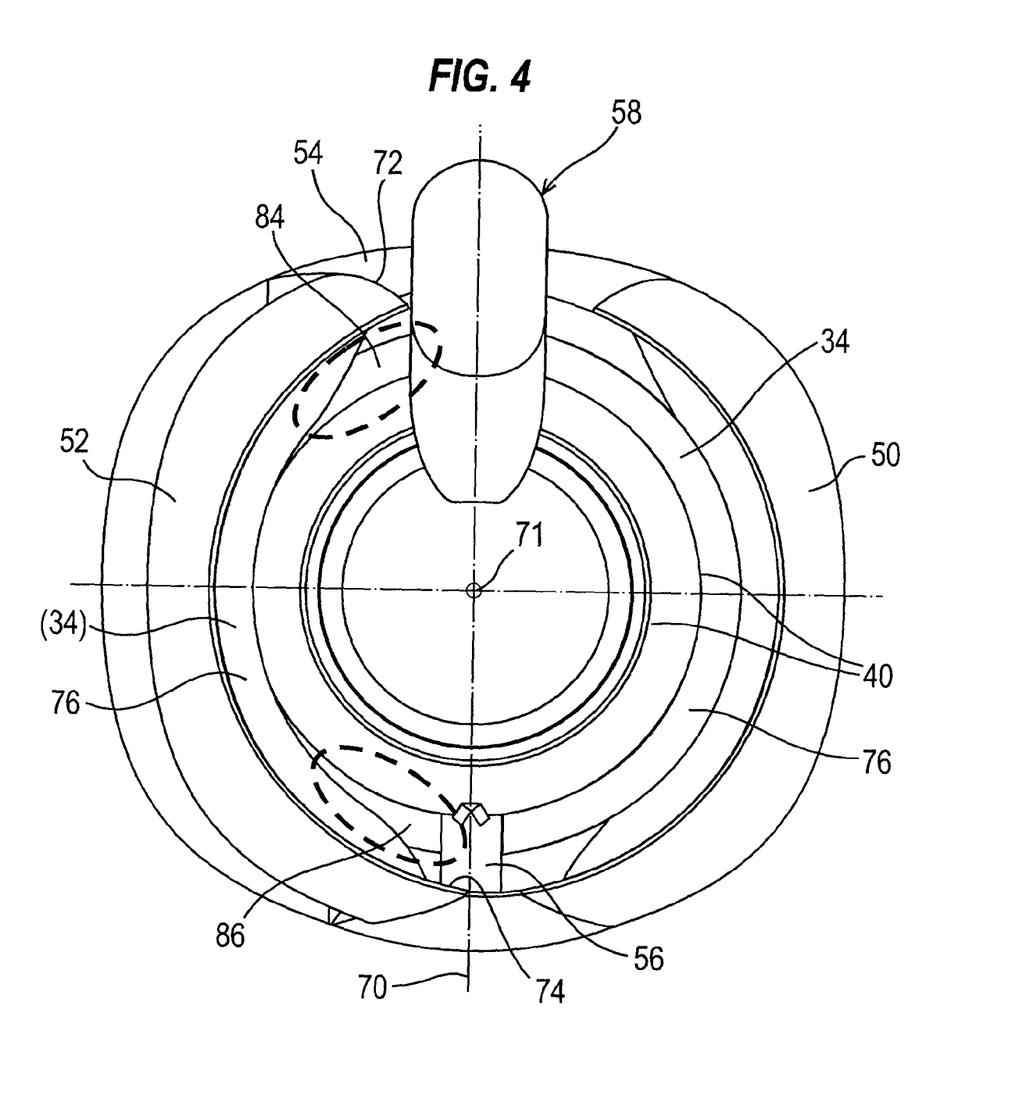
FIG. 4 shows a rear, axially directed view of the engine shown in FIGS. 3A and 3B wherein the right hand side of FIG. 4 shows the thrust reverser arrangement stowed and the left hand side shows it deployed.

The area of the by-pass fan duct 34 which the translating cowl portions 50, 52 are seeking to block when in the operative deployed position is denoted in FIG. 4 by the reference numeral 34. For the sake of illustration, the right hand side of FIG. 4 shows the cowl portion 50 in the stowed position and the left hand side of FIG. 4 shows the cowl portion 52 in the deployed position, however, it will be appreciated that both cowl portions 50, 52 are either both stowed or both deployed. At the upper and lower end positions of the cowl portion 52 shown in the deployed position it will be seen that there are portions of the area of the by-pass fan duct which are not closed of by the cowl 52 (the same is true for the cowl portion 50 when in the deployed position), these areas being indicated by the areas 84, 86 encompassed by broken lines in oval form, and through which areas forward thrust continues to leak even when the cowl portions are deployed. Whilst the thrust reverser arrangement of the first embodiment of the present invention provides adequate reverse thrust since a major proportion of the by-pass fan duct area is blocked, it is desirable to be able to prevent or minimise residual forward thrust so as to maximise the reverse thrust achieved.

Figure 5:
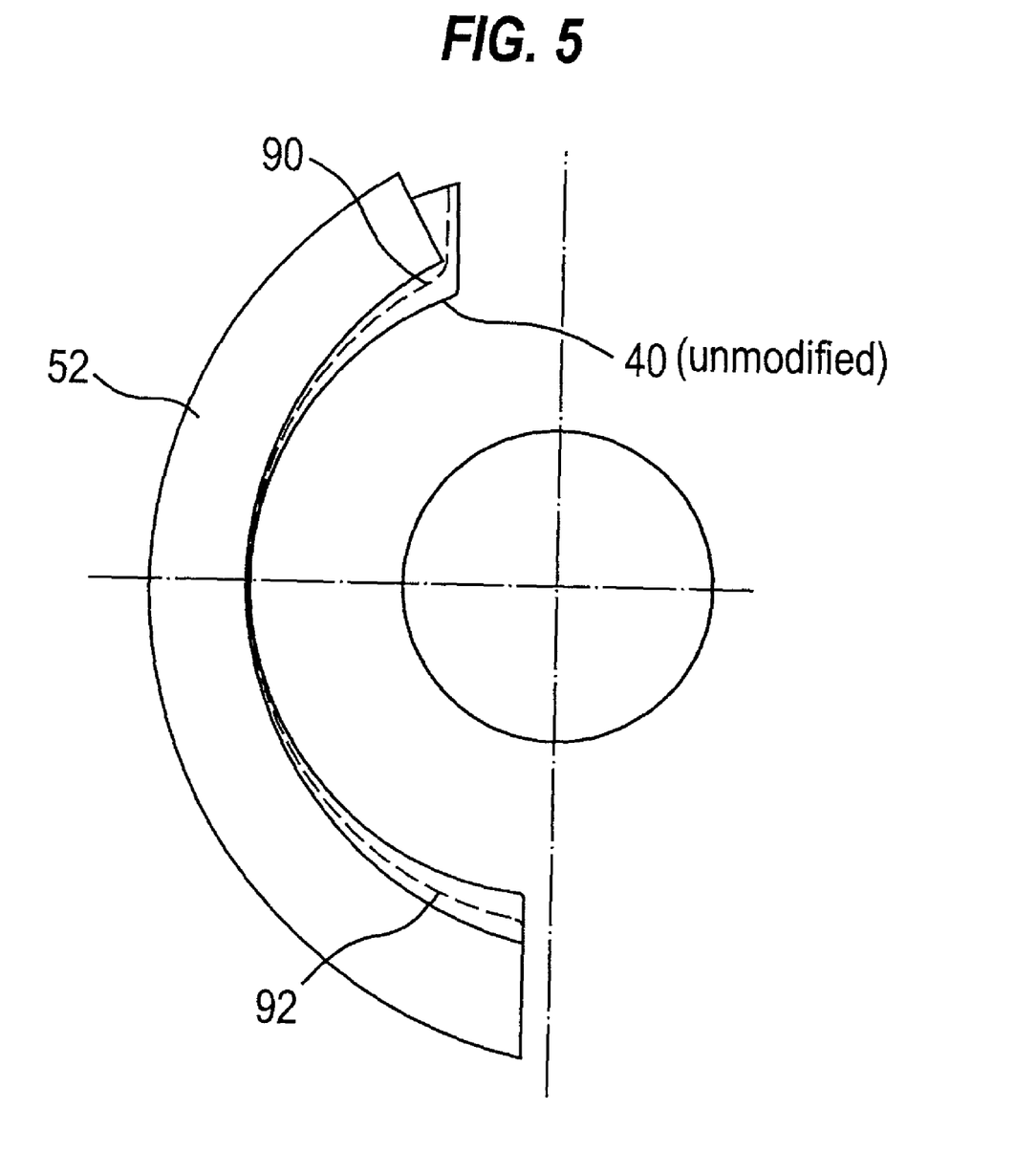
FIG. 5 shows a partial schematic view similar to that of FIG. 4 of a second embodiment of a thrust reverser according to the present invention showing modifications to the external profile of the core cowl with the translating cowl portion in the deployed position.

FIG. 5 shows schematically a second embodiment of the present invention comprising a modification to the shape of the core or inner by-pass fan duct cowl 40 in the regions of areas 84, 86. In this second embodiment the radial extent of the core cowl 40 is increased in the 11 o'clock 90 and 6 o'clock 92 positions adjacent areas 84, 86 (so too are the corresponding portions at the 1 o'clock and opposite 6 o'clock positions as viewed on the right hand side of FIG. 4) so as to more closely approach the deployed cowl portion inner leading edge portion 76 in these positions. This has the effect of reducing the by-pass fan duct 34 area in these regions when the translating cowl portions are in their stowed position thus reducing the flow area in these regions. This is compensated for by increasing the area of the by-pass fan duct area 34 in the areas which are completely blocked by the translating cowl portions 50, 52, for example, in the 10 o'clock to 7 o'clock and 2 o'clock to 5 o'clock sweeps by, for example, reducing the radial extent of the core cowl 40. Clearly, the circumferential and radial shape of the translating cowl inner leading edge portion 76 will be adapted to cooperate with the revised shape of the core cowl 40 when in the deployed position.

Figure 6A:
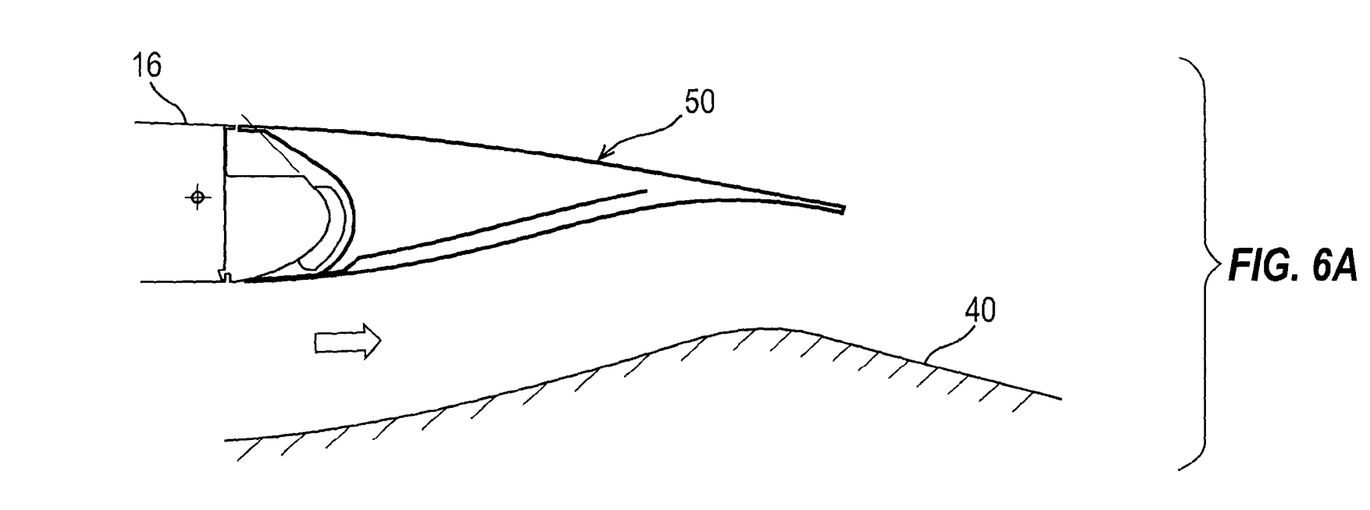
FIGS. 6A and 6B show views of a third embodiment of a thrust reverser arrangement according to the present invention, the views being similar to those of FIGS. 2A and 2B.
Figure 6B:
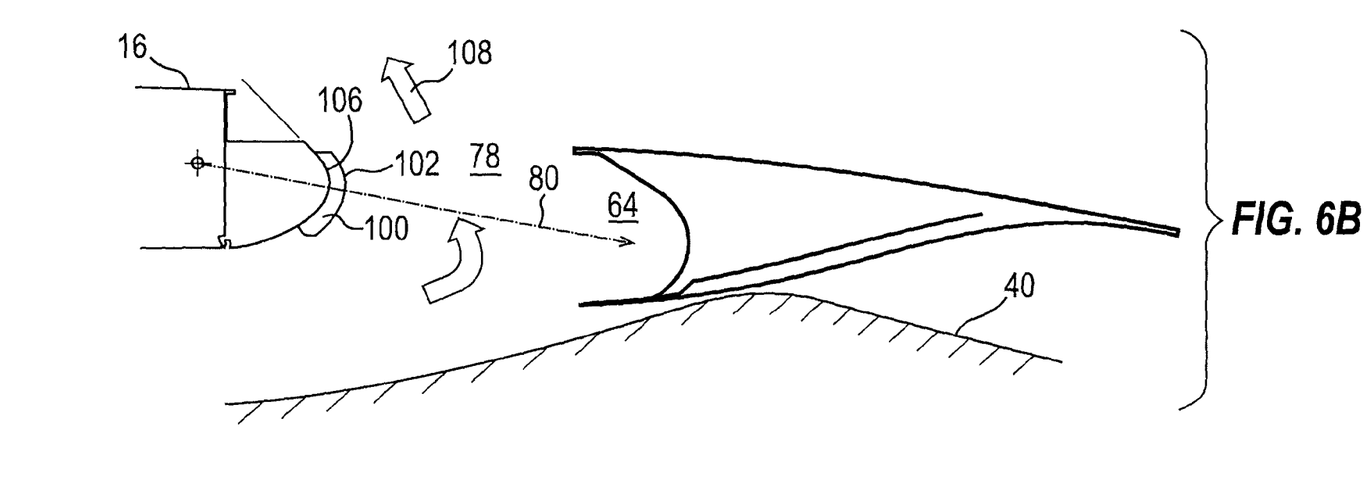

A third embodiment of the present invention is shown with reference to FIGS. 6A and 6B; 6A showing the thrust reverser arrangement in the stowed position and 6B in the deployed position. The basic structure of the reverse thrust arrangement in this embodiment is essentially the same as that described with reference to FIG. 2. However, in this embodiment, the reverse air flow assisting cascades 66 are replaced by a slot 100 arrangement defined by slats 102. The shape of the cavity 64 is so formed as to generate suitable flow and back pressure characteristics to assist air flow out of the second gaseous fluid exit opening 78, the slats 102 assisting the air flow to adhere to a nose portion 106 of the fixed cowl 16 to prevent flow separation and maximise reverse thrust air flow 108. The principles relating to control of air flow in this embodiment are fully described in EP-A-1 515 035 of common ownership herewith.

Figure 7A:
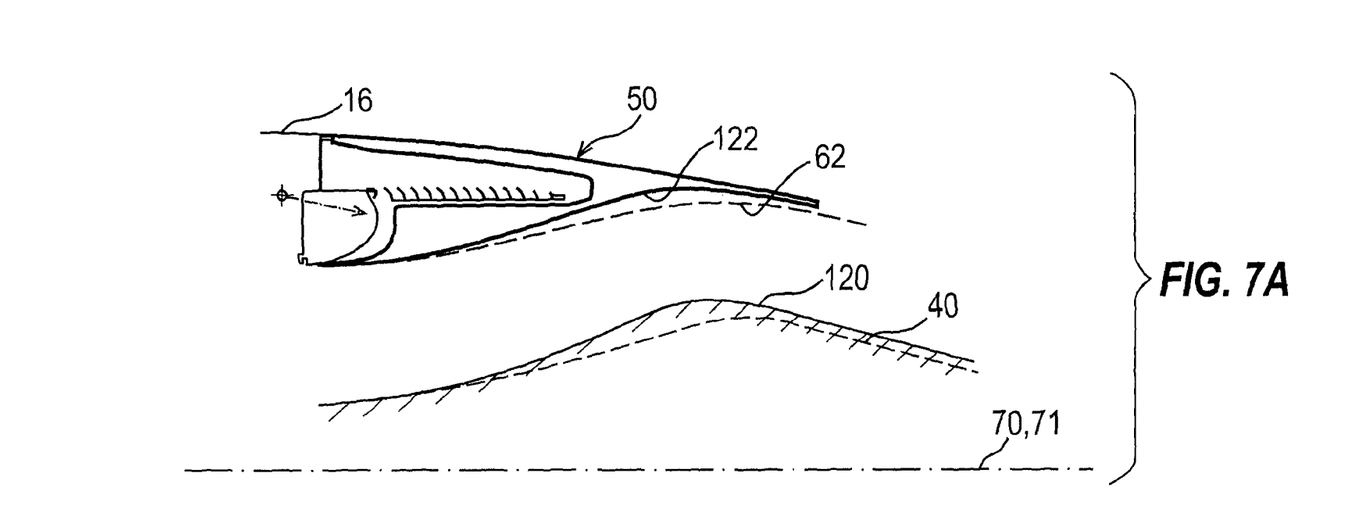
FIGS. 7A and 7B show views of a fourth embodiment of a thrust reverser according to the present invention, the views being similar to those of FIGS. 2A and 2B.
Figure 7B:
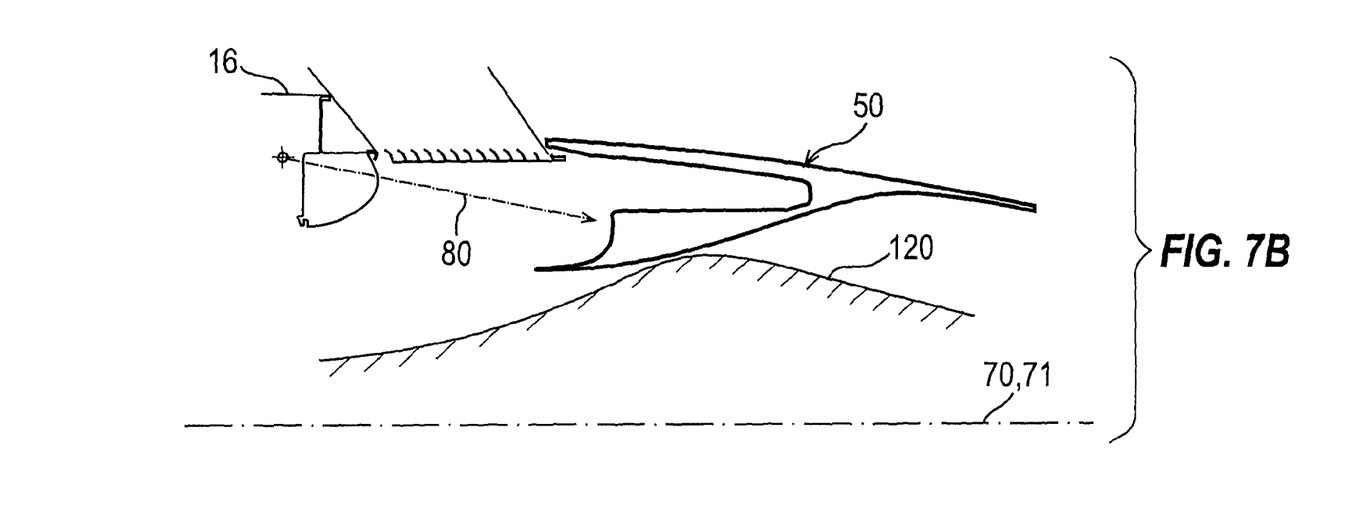

A fourth embodiment of the present invention is shown with reference to FIG. 7. In this embodiment, the reverse thrust arrangement is essentially the same in principle and as described with reference to FIGS. 2, 3 and 4, however, the angle along which the slider rails (not shown) are set to the vertical plane 70 is different from that of the previous embodiments. In this embodiment, the angle of the slider rails is 7° to the vertical plane 70. The effect of this is that the cowl portions 50, 52 do not converge towards each other during deployment at the same rate as in the first embodiment, for example. However, as shown in FIG. 7A, a further modification is made to the shape of the core cowl 40 wherein the radial extent of the core cowl is increased from the optimum (40 in FIG. 2 and shown by dashed lines in FIG. 7) to a more pronounced curvature 120. The corresponding inner wall curvature 122 of the translating cowl portion 50 is also curved to complement that of the core cowl. However, compared with actual applications of "natural blockage" thrust reversers as described with reference to GB-A-2 368 566, of common ownership herewith, the changes to the by-pass fan duct curvature are much less exaggerated and cause only minimal effects on forward thrust performance and consequently, fuel burn. The advantage of this embodiment is that even greater weight savings may be achieved through a shorter deployment stroke of the translating cowl portions (and smaller actuators) for only a minimal effect on forward thrust performance. The lower angle along which the cowl portions move also has consequent benefits in reducing the area (described with reference to FIGS. 4 and 5) through which residual forward thrust leakage occurs when the translating cowl portions are deployed. Thus, the requirement for shape changes to the core cowl and/or to the internal shape of the translating cowl portions as described hereinabove is reduced.

Figure 8A:
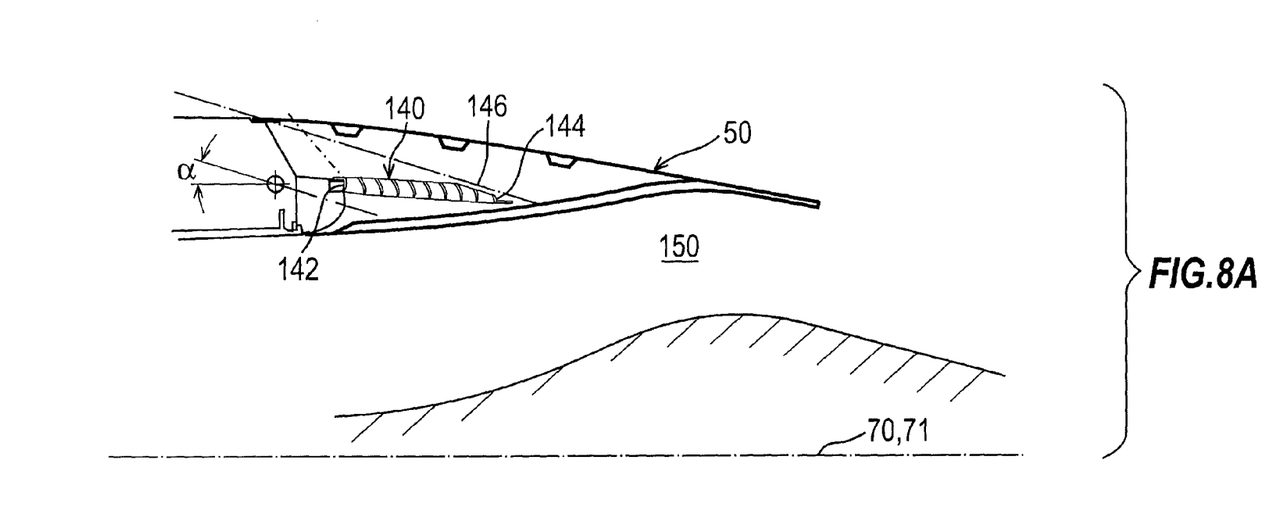
FIGS. 8A and 8B which show views of a fifth embodiment of a thrust reverser according to the present invention, the views being similar to those of FIGS. 2A and 2B.
Figure 8B:
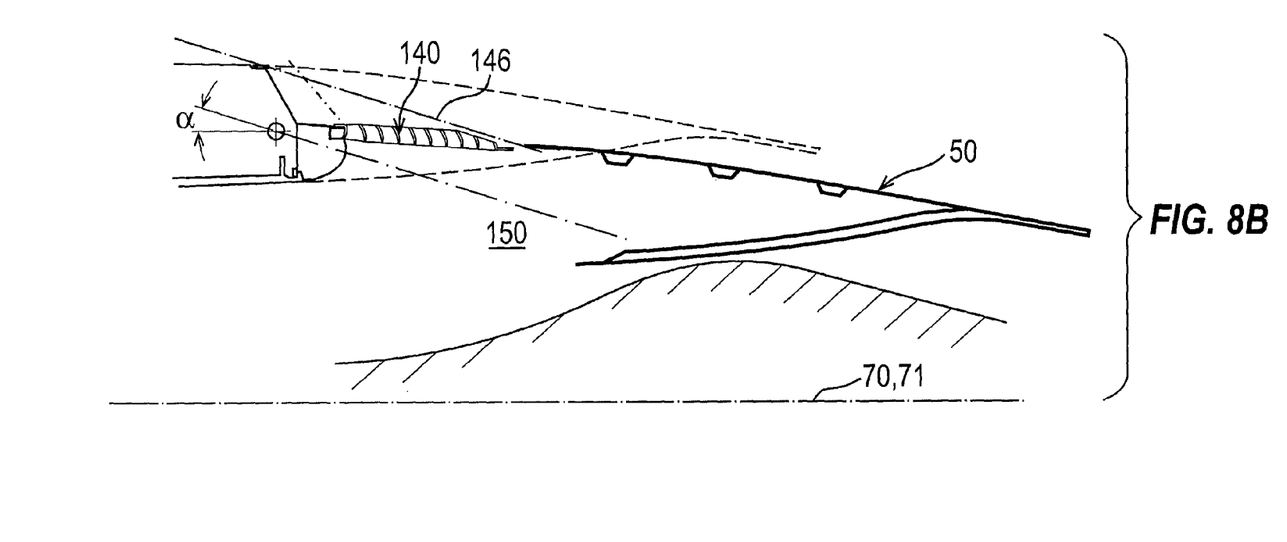

A fifth embodiment of the present invention is shown with reference to FIGS. 8A and 8B. In this embodiment, the cascades 140 are provided in a different orientation with respect to the engine axis 71 and, instead of being substantially parallel to the axis 71, they are themselves canted or tilted relative to the engine axis. In the embodiment shown in FIG. 8, the cascades 140 are mounted at an angle of 4° to the axis 71 thus, the cascades have a frusto-conical appearance with the leading edge 142 having a greater diameter than the trailing edge 144. Thus, the canted cascades permit the translating cowl portion 50 to move at a steeper angle to the axis 71 and vertical plane 70 since the cascade trailing edge is effectively moved further away from the trajectory, indicated by the dashed line 146, of the forward edge (relative to the engine) of the moving cowl portion 50. In this embodiment the angle of movement of the cowl portion 50 along the sliders (not shown) is 17° (indicated by the angle $\alpha$) to the axis 71 and plane 70. The further advantage of this embodiment where the canted cascades permit a steeper angle of movement is that the deployment stroke of the translating cowl portions is significantly reduced. Consequent benefits of a shorter stroke are as set out above in reduced weight and complexity with the possibility of greater aerodynamic optimisation of the shape or profile of the by-pass fan duct 150. The fifth embodiment may be more applicable to a larger, more powerful engine where the benefits to be gained from aerodynamic optimisation of the by-pass fan duct profile and reduced fuel burn are more likely to outweigh the benefit of increased reverse thrust, by maximisation of blockage of by-pass fan duct area, which reverse thrust will, in any case, be entirely adequate.

The embodiments of the present invention described hereinabove are for illustrative purposes only and are not limiting. For example, the slot and slat arrangement of FIG. 6 may be employed in the thrust reverser arrangements of FIGS. 2 and/or 7, for example, instead of the cascade flow diverters. Furthermore, to the extent that it is possible and/or applicable any features shown in any of the embodiments may be used in other embodiments with the appropriate modifications as would be understood by the person skilled in the art.

The invention claimed is:

1. A power unit for providing propulsive thrust by means of a flow of gaseous fluid, the power unit comprising:
    an efflux duct defining a first fluid flow path along which the gaseous fluid travels for discharge from a first fluid exit opening to provide the propulsive thrust; and
    a thrust reversing structure which, when in a deployed position, redirects the flow of the gaseous fluid along a second fluid flow path to discharge from a second fluid exit opening to provide reverse thrust;
    wherein the thrust reversing structure comprises longitudinally translating cowl portions defining inner and outer surfaces extending between leading and trailing circumferential ends,
    wherein the translating cowl portions are moveable from a stowed position to a deployed position,
    wherein, when in the deployed position, the inner surfaces of the translating cowl portions adjacent to the leading circumferential ends are positioned adjacent to a core cowl surface to block a major proportion of the first fluid exit opening and to cause the gaseous fluid to efflux from the second fluid exit opening,
    wherein the translating cowl portions move in a generally longitudinal direction towards the deployed position along a path which is inclined to the power unit axis wherein an angle of inclination of the path with respect to a vertical plane defined by the power unit axis lies in a range from 5° to 20°.

2. A power unit according to claim 1 wherein the angle of inclination lies in the range from 5° to 12°.

3. A power unit according to claim 1 wherein the translating cowl portions move relative to and along fixed structures adjacent to the circumferential ends of the translating cowl portions.

4. A power unit according to claim 3 wherein a 3-dimensional shape of a cowl surrounding and covering a core structure of the power unit and an internal shape of the translating cowl portions are adapted adjacent the circumferential ends such that when in the deployed position, the proportion of the first fluid exit opening blocked by the thrust reverser arrangement is increased.

5. A power unit according to claim 4 wherein an area of the first fluid flow path is increased in regions circumferentially remote from the circumferential ends of the translating cowl portions.

6. A power unit according to claim 5, wherein the core cowl comprises a right hand side and a left hand side, wherein the 3-dimensional shape of the right hand side is modified at 1 o'clock and 6 o'clock positions adjacent to the fixed structures, and wherein the 3-dimensional shape of left hand side is modified at 11 o'clock and 6 o'clock positions adjacent to the fixed structures so that the right hand and the left hand sides approximate a shape of an inner leading edge portion of the translating cowl portions in the deployed position.

7. A power unit according to claim 1 wherein an area of the first fluid flow path varies around a circumference thereof.

8. A power unit according to claim 1 wherein the second fluid exit opening has associated therewith cascade devices.

9. A power unit according to claim 8 wherein the cascade devices are canted at a cascade angle to the power unit axis.

10. A power unit according to claim 9 wherein the cascade angle lies in a range from 0.5° to 10°.

11. A power unit according to claim 10 wherein the cascade angle lies in a range from 2° to 7°.

12. A power unit according to claim 1 wherein the second fluid exit opening has a slot and slat arrangement to assist with redirection of gaseous fluid.

13. The power unit of claim 1 wherein, between the leading and the trailing circumferential ends of the translating cowl portions, the inner surface curves from a first position disposed apart from the outer surface to a second position disposed adjacent to the outer surface, thereby providing aerodynamic continuity for a radially outer surface of the by-pass fan duct when the translating cowl portions are in the stowed position.

* * * * *